Figure 1:
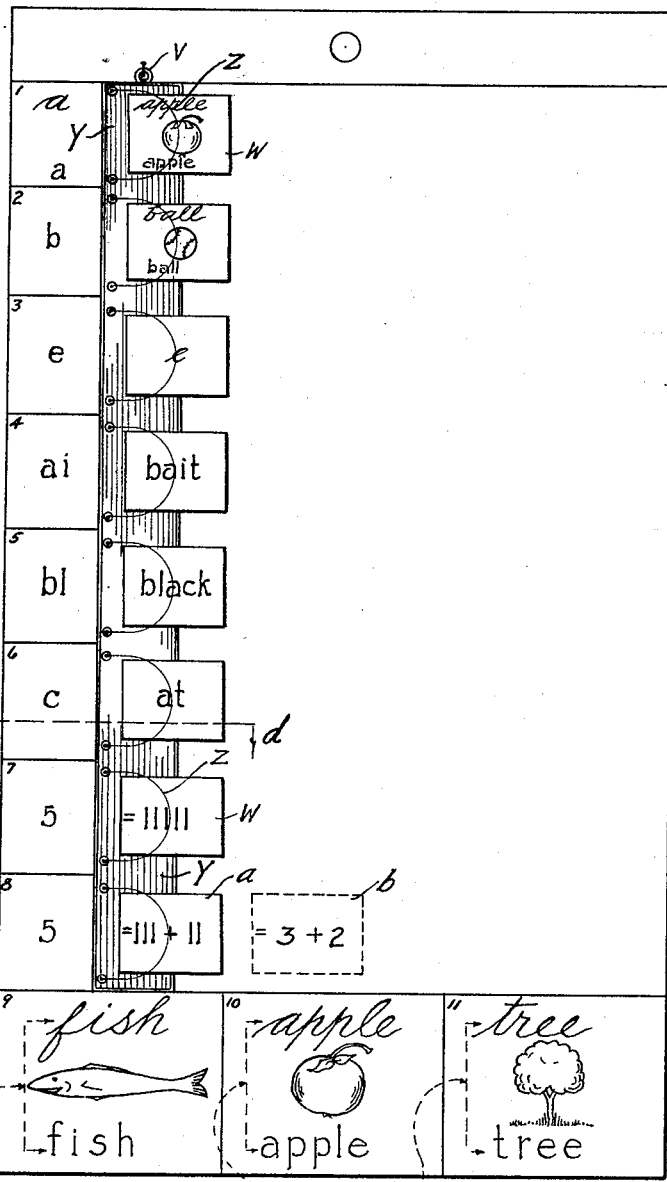

April 18, 1933.  F. E. FISHER  1,904,723
EDUCATIONAL DEVICE
Filed Dec. 16, 1930

Frances E. Fisher  INVENTOR.

Patented Apr. 18, 1933

1,904,723

UNITED STATES PATENT OFFICE

FRANCES E. FISHER, OF TWIN FALLS, IDAHO

EDUCATIONAL DEVICE

Application filed December 16, 1930. Serial No. 502,836.

This invention relates to educational devices and is intended for use in classrooms and also in the home.

The present device is intended primarily for either kindergarten or first grade scholars, and the prime object of the invention is to familiarize the child with the alphabet, numerals and words by associating the same with pictures of objects well known to the child and which contain the corresponding letters of the alphabet, numerals or words.

The device is in the nature of a chart and includes a body or base which may be hung upon the wall or placed upon a desk, and associated with the body or base are letters of the alphabet, combinations of letters, numbers and words. There are also provided groups of words containing letters of the alphabet, numbers and pictures of objects together with means for selectively and detachably mounting the cards upon the body or base in cooperative relation with the other data or indicia upon the body or base whereby the child may view it.

Figure 2:

In the drawing:

Fig. 1 is a front elevation of an educational device embodying the features of the present invention, and Fig. 2 is a cross-section on the line $d$—$d$.

The present device, which is in the nature of a chart, includes a base or body "X" which may be of any suitable material, as for instance heavy cardboard. This body or base may be of any suitable dimensions and is preferably rectangular in shape having its longest dimension from top to bottom of the body. Any suitable means may be provided for hanging the device on a wall, as for instance a hole may be provided at the top edge of the body, and said body portion may be folded over as indicated to stiffen the top edge thereof.

Along one longitudinal edge of the body member, preferably the left-hand edge there is lined off a vertical column which is subdivided by transverse lines into a vertical series of spaces, numbered on the drawing from 1 to 8 inclusive. In each space certain indicia are provided. In space number 1 the letter "$a$" appears in script and in print.

Other spaces contain other letters of the alphabet. Spaces 4 and 5 contain combinations of letters as "$ai$" and "$bl$".

Spaces 7 and 8 contain the numeral 5.

Positioned upon the body of the chart and in parallelism with the indicia column of the chart there is a flat strip or bar "Y", of suitable material, as for instance metal which is detachably held upon the body of the chart in any suitable manner, as for instance by means of a hook or eye "V" provided at the top edge of the strip and intended for engagement with a pin or other device carried by the body of the chart. Upon the strip or bar "Y" is provided a longitudinal series of spring clips "Z", there being one such spring clip for each space or division of the indicia column of the chart. As shown in the drawing, the spring clip is a substantially U-shaped wire member having its ends secured to the strip or bar "Y" at the left-hand edge of the latter. The wire is of course free throughout its length between the secured or anchored ends thereof and, as best shown in Fig. 2 of the drawing, is bent so that its intermediate portion will bear with a considerable degree of pressure against the strip or bar "Y".

The device further includes cards, designated "W" on the drawing, such cards being designed to be detachably held upon the strip or bar "Y" by being thrust beneath one of the spring clips "Z". Each card contains suitable data or indicia, for instance the word and a picture of the object denoted by the word, it being the purpose of the present invention to associate one of the cards with that indicia in the column of indicia which corresponds to the data on the card, whereby the child will associate the letter, or other indicia on the chart body with the picture and other data on the card. For instance the card at the top of Fig. 1 bears the word "apple" appearing in script and in print, and also bears the picture of an apple. This card is placed opposite and in cooperative relation with the letter "$a$" in the indicia column, thus showing the child that this character is the letter "$a$" as it appears in the word "apple"; and by this association of ideas the child will readily memorize the letter "a". This idea is carried on throughout the sections of the indicia column by appropriate cards detachably secured to the strip "Y" by the various spring clips "Z", as will be readily understood by referring to the other cards.

While not actually shown on the drawing, it will be explained that a set of cards may be provided, each card having the letter "a" appearing in a different word with pictures of the objects denoted by the different words, and these cards may be selectively placed in cooperative relation with the letter "a" on the body of the chart, and by this repeated operation exhibiting different words and different objects, the child will readily associate the sound of the letter with the appearance thereof.

While only a few letters, combinations thereof, and numerals have been shown on the chart body in Fig. 1, it will of course be understood that a plurality of chart bodies will be provided having different indicia thereon, thereby to include the entire alphabet and such other indicia as may be desired for the instruction of the child.

Referring to subdivision 7 of the indicia column which contains the numeral "5" it will be seen that the detachable card "W" associated therewith contains five parallel lines, thereby indicating to the child the value of the numeral 5. In subdivision 8 the value of 5 has been indicated on the card by three parallel lines then the plus sign and then two parallel lines. In dotted lines to the left is indicated the reverse side of the card, and in place of parallel lines the numerals 3 and 2 are employed for the same purpose as the parallel lines.

Transversely across the bottom portion of the chart there is lined off a transverse column subdivided into sections or divisions each containing the picture of an object and the name of the object in script and in print. The words and the pictures or illustrations in the transverse column have been selected to familiarize the child with the word which is made up of the initial letters of the three pictures which from left to right are those of a fish, an apple and a tree, and so by this kind of indicia, the child being familiar with the objects shown by the pictures can be readily taught to spell and pronounce the word fat. This, of course, is a mere example and many other selections can and will be made for the various charts.

It will of course be understood that the size of the chart may vary and the number of subdivisions of the columns may vary so as to provide more or less indicia or data upon any individual chart, and by providing a plurality of charts with different indicia or data the entire range of words required for teaching kindergarten and first grade children may be covered.

What is claimed is:

1. An educational device comprising a chart body having an indicia column subdivided into sections and provided with indicia in the respective sections, a replaceable strip or bar detachably positioned upon the chart body in parallelism with the indicia column, said strip or bar being provided with a series of spring clips, one for each section of the indicia column, said clips adapted to hold cards bearing indicia having relation to the indicia in the corresponding section of the indicia column of the chart body.

2. An education device comprising a chart body having an indicia column subdivided into sections and provided with indicia in the respective sections, a replaceable strip or bar detachably positioned upon the chart body in parallelism with the indicia column, and means provided upon the strip or bar for detachably holding indicia-carrying cards in cooperative relation with the sections of the indicia column.

3. An educational device comprising a chart body provided with an indicia column subdivided into sections containing indicia, and means carried by the chart body for detachably holding indicia-carrying cards in co-operative relation with the respective sections of the indicia column.

In testimony whereof I affix my signature.

FRANCES E. FISHER.